Sept. 6, 1938.   S. E. SHEPPARD ET AL   2,129,242
HEAT SENSITIVE COMPOSITIONS
Filed May 25, 1935
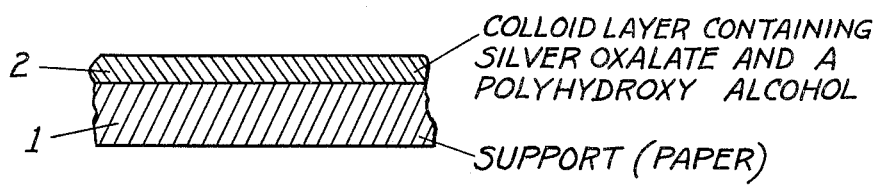
INVENTORS
Samuel E. Sheppard
Waldemar Vanselow
BY
ATTORNEYS Patented Sept. 6, 1938

2,129,242

UNITED STATES PATENT OFFICE 2,129,242

HEAT SENSITIVE COMPOSITIONS

Samuel E. Sheppard and Waldemar Vanselow, Rochester, N. Y., assignors, by mesne assignments, to Eastman Kodak Company, Jersey City, N. J., a corporation of New Jersey Application May 25, 1935, Serial No. 23,514

7 Claims. (Cl. 91—68)

This invention relates to sensitive materials and more particularly to sensitive materials which change color when heated.

In our prior Patent No. 1,976,302, we have described photothermographic compositions sensitized with metallic oxalates. These compositions when exposed to light to form catalyzing nuclei change their color when later exposed to heat for a short time. In these compositions a relatively high temperature is necessary in order to cause an appreciable and rapid change in color, temperatures in the neighborhood of 100° C. being required. It is frequently desirable to have a composition which changes color at a lower temperature, and which need not be exposed to light to catalyze the color-changing reaction.

Accordingly, it is an object of the present invention to provide a thermographic composition which changes color when submitted to heat alone without previous exposure to light. It is a further object to provide a composition which exhibits a visible change in color at lower temperatures than compositions previously used.

These objects are accomplished by adding polyhydroxy alcohols to emulsions of certain light-sensitive salts.

The single figure of the accompanying drawing is a sectional view of a sensitized paper formed according to our invention.

A thermographic element made according to our invention consists of a suitable sensitized emulsion carried on a support. The emulsions which we use are emulsions of metallic oxalates, such as silver oxalate in a carrier such as gelatin. In place of silver oxalate mercurous oxalate may be used, but we have found that higher temperatures are required to effect a color change when this compound is used. In place of the gelatin any suitable carrier for the emulsion may be used, such as casein, cellulosic compounds such as regenerated cellulose or cellulose esters, resins such as vinyl compounds, or other colloidal materials.

These emulsions, which are light-sensitive, are sensitized to the desired temperature range by adding to them any polyhydroxy alcohol. Among the compounds which may be used for this purpose are glycerin, glycols such as ethylene glycol and propylene glycol, and higher polyhydroxy alcohols, incluing glucose.

The emulsion formed in this way is carried by a support formed of any suitable material, such as paper, cloth, metal, or cellulosic compositions, such as cellulose esters, or a colloidal material such as gelatin.

In the accompanying drawing which illustrates one form of photographic element made according to our invention, 1 is a support of paper, or other suitable material, on which is coated the layer 2 consisting of a colloidal material containing silver oxalate and a polyhydroxy alcohol.

We will now give several embodiments of our invention which are by way of example only.

Example I

An emulsion is made by mixing the following two solutions:

Solution A: Parts
   Silver nitrate_____ 50
   Water _____ 500
   Gelatin _____ 30

Solution B:
   Potassium oxalate_____ 32
   Water _____ 500
   Gelatin _____ 30

Solution A is added to Solution B with vigorous agitation at a temperature of about 45° C. We then add 100 parts of propylene glycol to the emulsion. The emulsion is then coated on a suitable support, chilled and dried. The composition formed in this way shows a decided darkening at temperatures between 75° F. and 100° F. when incubated for a period of time ranging from 3 days upwards to six weeks.

Example II

All emulsion is made by mixing the specific solution in Example I and adding thereto 100 parts of a two percent aqueous solution of glucose.

Heat sensitive compositions made according to our invention are valuable in determining the temperature conditions under which perishable goods are stored. For example, photographic materials, such as sensitive films, plates and paper are impaired in value when stored for a great length of time at temperatures above 75–100° F. Heat sensitive compositions made according to our invention may be stored along with such sensitive photographic material, and if the heat sensitive material shows a darkening or change of color, the user of the photographic material will know at once that it has been stored at an excessively high temperature and that its sensitivity may be impaired. Numerous other uses and advantages of the material made according to our invention will be readily apparent.

We have referred in the claims to the formation of an image on exposure of our sensitive compositions to heat. It is understood that we are using the term "image" in the broad sense to include any relative darkening or change in color of the sensitive material, whether or not the form thus produced assumes a definite shape.

We consider as included within our invention all variations and equivalents coming within the scope of the appended claims.

What we claim as new and desire to secure as Letters Patent of the United States is:

1. A thermographic element comprising a support and a heat-sensitive colloid layer thereon containing a heat-sensitive oxalate and as the only sensitizer for the oxalate a polyhydroxy alcohol having not more than 5 hydroxy groups in the molecule.

2. A thermographic element comprising a support and a heat-sensitive colloid layer thereon containing as the only sensitizer a heat-sensitive oxalate and glycerin.

3. A thermographic element comprising a support and a heat-sensitive colloid layer thereon containing a heat-sensitive oxalate and as the only sensitizer for the oxalate a glycol.

4. A thermographic element comprising a support and a heat-sensitive colloid layer thereon containing a heat-sensitive oxalate and propylene glycol as the only sensitizer for the oxalate.

5. A thermographic element comprising a support and a heat-sensitive colloid layer thereon containing as the only sensitizer a heat-sensitive oxalate and glucose.

6. The method of making a visible image which comprises sensitizing a colloid layer with a light-sensitive oxalate and glucose in the absence of other sensitizer and then submitting the layer to heat to produce an image therein.

7. A thermographic element comprising a support and a heat-sensitive colloid layer thereon containing silver oxalate and as the only sensitizer for the oxalate a polyhydroxy alcohol having not more than 5 hydroxy groups in the molecule.

SAMUEL E. SHEPPARD.
WALDEMAR VANSELOW.